US008040680B2

(12) United States Patent
Tsukazawa

(10) Patent No.: US 8,040,680 B2
(45) Date of Patent: Oct. 18, 2011

(54) INFORMATION PROCESSING APPARATUS AND NONVOLATILE SEMICONDUCTOR STORAGE DEVICE

(75) Inventor: Hisao Tsukazawa, Oume (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 12/782,601

(22) Filed: May 18, 2010

(65) Prior Publication Data
US 2010/0220437 A1   Sep. 2, 2010

Related U.S. Application Data

(63) Continuation of application No. 12/330,403, filed on Dec. 8, 2008, now Pat. No. 7,760,496.

(30) Foreign Application Priority Data

Dec. 27, 2007 (JP) ................................. 2007-338082

(51) Int. Cl.
*H05K 7/00* (2006.01)
*H05K 5/00* (2006.01)
(52) U.S. Cl. .................... 361/777; 361/679.33; 361/752; 361/760
(58) Field of Classification Search ............. 361/679.33, 361/752, 760, 777
See application file for complete search history.

(56) References Cited

U.S. PATENT DOCUMENTS

| 5,490,041 A * | 2/1996 | Furukawa et al. ............. 361/777 |
| 5,652,462 A * | 7/1997 | Matsunaga et al. ........... 257/686 |
| 5,784,328 A | 7/1998 | Irrinki et al. |
| 6,041,850 A | 3/2000 | Esser et al. |
| 6,048,095 A | 4/2000 | Shindo et al. |
| 6,114,785 A | 9/2000 | Horng |
| 6,157,166 A | 12/2000 | Odaohhara et al. |
| 6,239,770 B1 | 5/2001 | Martesuo |
| 6,239,970 B1 | 5/2001 | Nakai et al. |
| 6,448,602 B1 | 9/2002 | Sakashita et al. |
| 6,751,113 B2 * | 6/2004 | Bhakta et al. .................. 365/63 |
| 6,836,704 B2 | 12/2004 | Walsh |

(Continued)

FOREIGN PATENT DOCUMENTS
JP  64-047077  2/1989
(Continued)

OTHER PUBLICATIONS

Japanese Patent Application No. 2009-199350, Notification of Reason for Refusal, mailed Oct. 26, 2010, (English Translation).

(Continued)

*Primary Examiner* — Robert J Hoffberg
(74) *Attorney, Agent, or Firm* — Blakely, Sokoloff, Taylor & Zafman LLP

(57) ABSTRACT

An information processing apparatus including: a main unit; a cooling fan that suctions open air into the main unit to cool inside the main unit with an air flow; and a nonvolatile semiconductor storage device that is provided within the main unit to be used as an external storage device, the device including: a printed circuit board; a nonvolatile semiconductor memory that is mounted on the printed circuit board; a memory controller that is mounted on the printed circuit board and controls the nonvolatile semiconductor memory; and a temperature sensor that is mounted on the printed circuit board and detects temperature within the nonvolatile semiconductor storage device, wherein the memory controller is disposed at an upstream side of the air flow and the temperature sensor is disposed at a downstream side of the air flow.

10 Claims, 7 Drawing Sheets

U.S. PATENT DOCUMENTS

| | | | |
|---|---|---|---|
| 7,165,183 B2 | 1/2007 | Okada et al. | |
| 7,236,358 B2 | 6/2007 | Dobbs et al. | |
| 7,260,007 B2 | 8/2007 | Jain et al. | |
| 7,301,776 B1 | 11/2007 | Wang et al. | |
| 7,315,454 B2 | 1/2008 | Schuster | |
| 7,517,231 B2 | 4/2009 | Hiew et al. | |
| 7,517,252 B2 | 4/2009 | Ni et al. | |
| 7,554,448 B2 | 6/2009 | Tomioka | |
| 7,576,990 B2 | 8/2009 | Ni et al. | |
| 7,595,998 B2 | 9/2009 | Tokunaga | |
| 7,649,742 B2 | 1/2010 | Ni et al. | |
| 7,649,743 B2 * | 1/2010 | Ni et al. | 361/752 |
| 7,760,496 B2 | 7/2010 | Tsukazawa | |
| 2003/0094628 A1 | 5/2003 | Yeh et al. | |
| 2004/0136108 A1 | 7/2004 | Tanimoto | |
| 2007/0057771 A1 | 3/2007 | Tomioka | |
| 2007/0098374 A1 | 5/2007 | Fujiwara | |
| 2007/0180264 A1 * | 8/2007 | Ni et al. | 713/186 |
| 2007/0211548 A1 | 9/2007 | Jain et al. | |
| 2007/0219644 A1 | 9/2007 | Sonobe | |
| 2007/0274032 A1 | 11/2007 | Ni et al. | |
| 2008/0038877 A1 | 2/2008 | Wang et al. | |
| 2008/0089020 A1 * | 4/2008 | Hiew et al. | 361/684 |
| 2008/0198545 A1 * | 8/2008 | Ni et al. | 361/684 |
| 2008/0200041 A1 | 8/2008 | Lin et al. | |
| 2008/0212297 A1 | 9/2008 | Ni et al. | |
| 2008/0266816 A1 | 10/2008 | Ni et al. | |
| 2009/0086448 A1 | 4/2009 | Hiew et al. | |
| 2009/0171513 A1 | 7/2009 | Tsukazawa | |
| 2010/0073860 A1 * | 3/2010 | Moriai et al. | 361/679.32 |
| 2010/0220437 A1 | 9/2010 | Tsukazawa | |
| 2011/0035813 A1 * | 2/2011 | Trantham | 726/34 |

FOREIGN PATENT DOCUMENTS

| | | |
|---|---|---|
| JP | 05-298961 | 11/1993 |
| JP | 5-298961 | 11/1993 |
| JP | 6-250799 | 9/1994 |
| JP | 06-250799 | 9/1994 |
| JP | 06342875 | 12/1994 |
| JP | 8-126191 | 5/1996 |
| JP | 08-126191 | 5/1996 |
| JP | 9074171 | 3/1997 |
| JP | 10255467 | 9/1998 |
| JP | 2000-112577 | 4/2000 |
| JP | 2000-172378 | 6/2000 |
| JP | 2000-173378 | 6/2000 |
| JP | 2002-175131 | 6/2002 |
| JP | 2004-006446 | 1/2004 |
| JP | 2004185542 | 7/2004 |
| JP | 2005-004758 | 1/2005 |
| JP | 2005-135350 | 5/2005 |
| JP | 2006-330913 | 12/2006 |
| JP | 2007-124853 | 5/2007 |
| JP | 2007129185 | 5/2007 |
| JP | 2007-226617 | 9/2007 |
| JP | 2007-257062 | 10/2007 |
| WO | 2009110140 | 9/2009 |

OTHER PUBLICATIONS

Japanese Patent Application No. 2009-199351, Notification of Reasons for Refusal, mailed Oct. 26, 2010, (English Translation).

Chinese Patent Application No. 200810190749.1, Notification of The First Office Action, mailed Aug. 12, 2010, (English Translation).

Japanese Patent Application No. 2007-338082; Notification of Reasons for Refusal; mailed Feb. 17, 2009 (English Translation).

Japanese Patent Application No. 2007-338082; Notification of Reason for Refusal; mailed May 26, 2009 (English Translation).

English machine translation of Sukegawa, JP 6-250799 (Sep. 9, 1994), translated on Mar. 9, 2011.

English machine translation of Obata, JP 8-126191 (May 5, 1996), translated on Mar. 9, 2011.

English machine translation of Shiina, JP 2007-257062 (Apr. 10, 20070), translated on Mar. 9, 2011.

United States Patent and Trademark Office, U.S. Appl. No. 12/782,603, Non-Final Office Action, mailed on Mar. 11, 2011.

United States Patent and Trademark Office, U.S. Appl. No. 12/782,603, Final Office Action, mailed on Dec. 1, 2010.

United States Patent and Trademark Office, U.S. Appl. No. 12/782,603, Non-Final Office Action, mailed on Aug. 4, 2010.

* cited by examiner

INFORMATION PROCESSING APPARATUS AND NONVOLATILE SEMICONDUCTOR STORAGE DEVICE

CROSS-REFERENCE TO RELATED APPLICATIONS

This application is a continuation based upon and claims the benefit of priority from U.S. patent application Ser. No. 12/330,403, filed Dec. 18, 2008 now U.S. Pat. No. 7,760,496.

This application is further based upon and claims the benefit of priority from Japanese Patent Application No. 2007-338082, filed on Dec. 27, 2007, the entire content of which are incorporated herein by reference.

BACKGROUND

1. Field

One embodiment of the present invention relates to an information processing apparatus and a nonvolatile semiconductor storage device.

2. Description of the Related Art

There is proposed a memory module provided with a memory package, a temperature sensor, and a temperature detection circuit. An example of such memory module is disclosed in JP-A-2007-257062.

The memory module includes a memory package mounted on a printed circuit board, a temperature sensor that measures the temperature of the memory package, and a temperature detection circuit that compares the temperature measured by the temperature sensor with a set temperature that is set in advance. Accordingly, the memory module can measure the temperature of the memory package with the temperature sensor and detect whether or not the measured temperature exceeds the set temperature with the temperature detection circuit.

However, in the known memory module, a target object whose temperature is to be detected by the temperature sensor is a memory package. For this reason, in case where a component serving as a heat source other than the memory package or a region with a higher temperature than a region where the memory package is mounted is present on the printed circuit board, there is a problem that the temperature of such a component or region cannot be detected by the temperature sensor.

SUMMARY

One of objects of the present invention is to provide an information processing apparatus and a nonvolatile semiconductor storage device capable of measuring the temperature of a region which is located between a semiconductor memory and a control unit and whose temperature is higher than those of other regions of a printed circuit board.

According to a first aspect of the present invention, there is provided an information processing apparatus including: a main unit; a cooling fan that suctions open air into the main unit to cool inside the main unit with an air flow; and a nonvolatile semiconductor storage device that is provided within the main unit to be used as an external storage device, the device including: a printed circuit board; a nonvolatile semiconductor memory that is mounted on the printed circuit board; a memory controller that is mounted on the printed circuit board and controls the nonvolatile semiconductor memory; and a temperature sensor that is mounted on the printed circuit board and detects temperature within the nonvolatile semiconductor storage device, wherein the memory controller is disposed at an upstream side of the air flow and the temperature sensor is disposed at a downstream side of the air flow.

According to a second aspect of the present invention, there is provided a nonvolatile semiconductor storage device that is provided within an information processing apparatus to be used as an external storage device, the device including: a printed circuit board; a nonvolatile semiconductor memory that is mounted on the printed circuit board; a memory controller that is mounted on the printed circuit board and controls the nonvolatile semiconductor memory; and a temperature sensor that is mounted on the printed circuit board between the nonvolatile semiconductor memory and the memory controller and detects temperature within the nonvolatile semiconductor storage device.

According to a third aspect of the present invention, there is provided a nonvolatile semiconductor storage device that is provided within an information processing apparatus to be used as an external storage device, the device including: a printed circuit board; a nonvolatile semiconductor memory that is mounted on the printed circuit board and includes a plurality of nonvolatile semiconductor memory packages; a memory controller that is mounted on the printed circuit board and controls the nonvolatile semiconductor memory; and a temperature sensor that is mounted on the printed circuit board between the nonvolatile semiconductor memory and the memory controller and detects temperature within the nonvolatile semiconductor storage device, wherein each of the nonvolatile semiconductor memory packages is formed in a shape having long sides and short sides, and wherein the nonvolatile semiconductor memory packages are arranged on the printed circuit board to align one of long sides and short sides of each of the nonvolatile semiconductor memory packages.

BRIEF DESCRIPTION OF THE SEVERAL VIEWS OF THE DRAWINGS

A general configuration that implements the various feature of the invention will now be described with reference to the drawings. The drawings and the associated descriptions are provided to illustrate embodiments of the invention and not to limit the scope of the invention.

FIG. 7A is a schematic diagram illustrating the appearance of an SSD according to a second embodiment of the invention, FIG. 7B is a plan view illustrating the SSD, and FIG. 7C is a bottom view illustrating the SSD.

DETAILED DESCRIPTION

Hereinafter, information processing apparatuses according to embodiments of the invention will be described in detail with reference to the accompanying drawings.

First Embodiment

Figure 1:
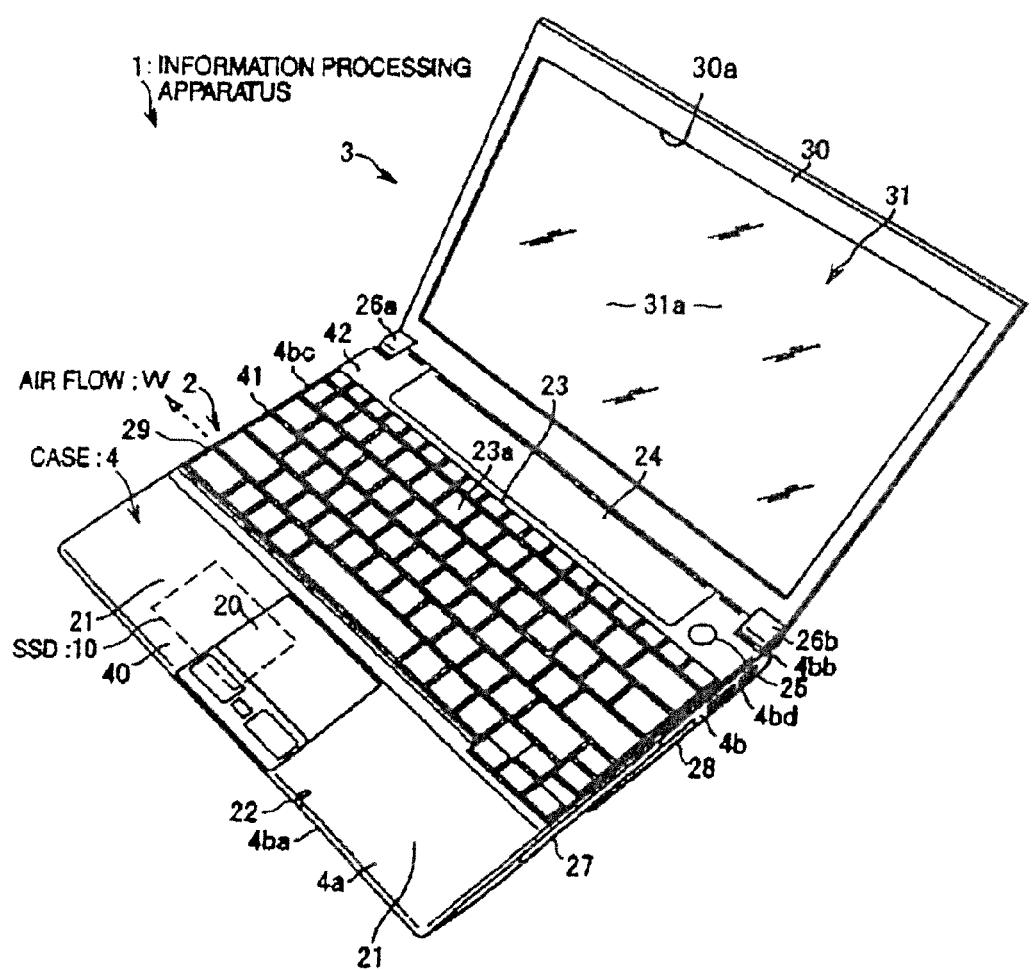
FIG. 1 is a schematic diagram illustrating the appearance of an information processing apparatus according to a first embodiment of the invention.

FIG. 1 is a schematic diagram illustrating the appearance of an information processing apparatus according to a first embodiment of the invention. An information processing apparatus 1 is configured to include a main unit 2 and a display unit 3 attached to the main unit 2.

The main unit 2 includes a box-shaped case 4, and the case 4 is provided with an upper wall 4a, a peripheral wall 4b, and a lower wall 4c. The upper wall 4a of the case 4 has a front portion 40, a middle portion 41, and a back portion 42 sequentially from the side near a user who operates the information processing apparatus 1. The lower wall 4c faces a placement surface on which the information processing apparatus 1 is placed. The peripheral wall 4b has a front wall 4ba, a rear wall 4bb, and side walls 4bc and 4bd on the left and right sides.

The front portion 40 includes a touch pad 20 that is a pointing device, a palm rest 21, and an LED 22 that is lighted in synchronization with an operation of each portion of the information processing apparatus 1.

The middle portion 41 includes a keyboard placement portion 23 to which a keyboard 23a capable of inputting alphabetic information and the like is attached.

The back portion 42 includes a battery pack 24 that is detachably attached, a power switch 25 that is provided on the right side of the battery pack 24 in order to supply power to the information processing apparatus 1, and a pair of hinge portions 26a and 26b that is provided on the left and right sides of the battery pack 24 in order to rotatably support the display unit 3.

An exhaust port 29 for exhausting air flow W from the inside of the case 4 to the outside is provided on the left side wall 4bc of the case 4. In addition, an OPTICAL DISK DEVICE (optical disc drive) 27 that can read/write data from/into optical storage media, such as a DVD, and a card slot 28 into/from which various kinds of cards 280 are taken are disposed on the right side wall 4bd, for example.

The case 4 is formed by a case cover including a part of the peripheral wall 4b and the upper wall 4a and a case base including a part of the peripheral wall 4b and the lower wall 4c. The case cover is detachably combined with the case base, and an accommodation space is formed between the case cover and the case base. For example, an SSD (solid state drive) 10 as a nonvolatile semiconductor memory is accommodated in the accommodation space. In addition, the SSD 10 will be described in detail later.

The display unit 3 includes a display case 30 having an opening 30a and a display portion 31, such as an LCD, that can display an image on a display screen 31a. The display portion 31 is accommodated in the display case 30, and the display screen 31a is exposed to the outside of the display case 30 through the opening 30a.

Figure 2:
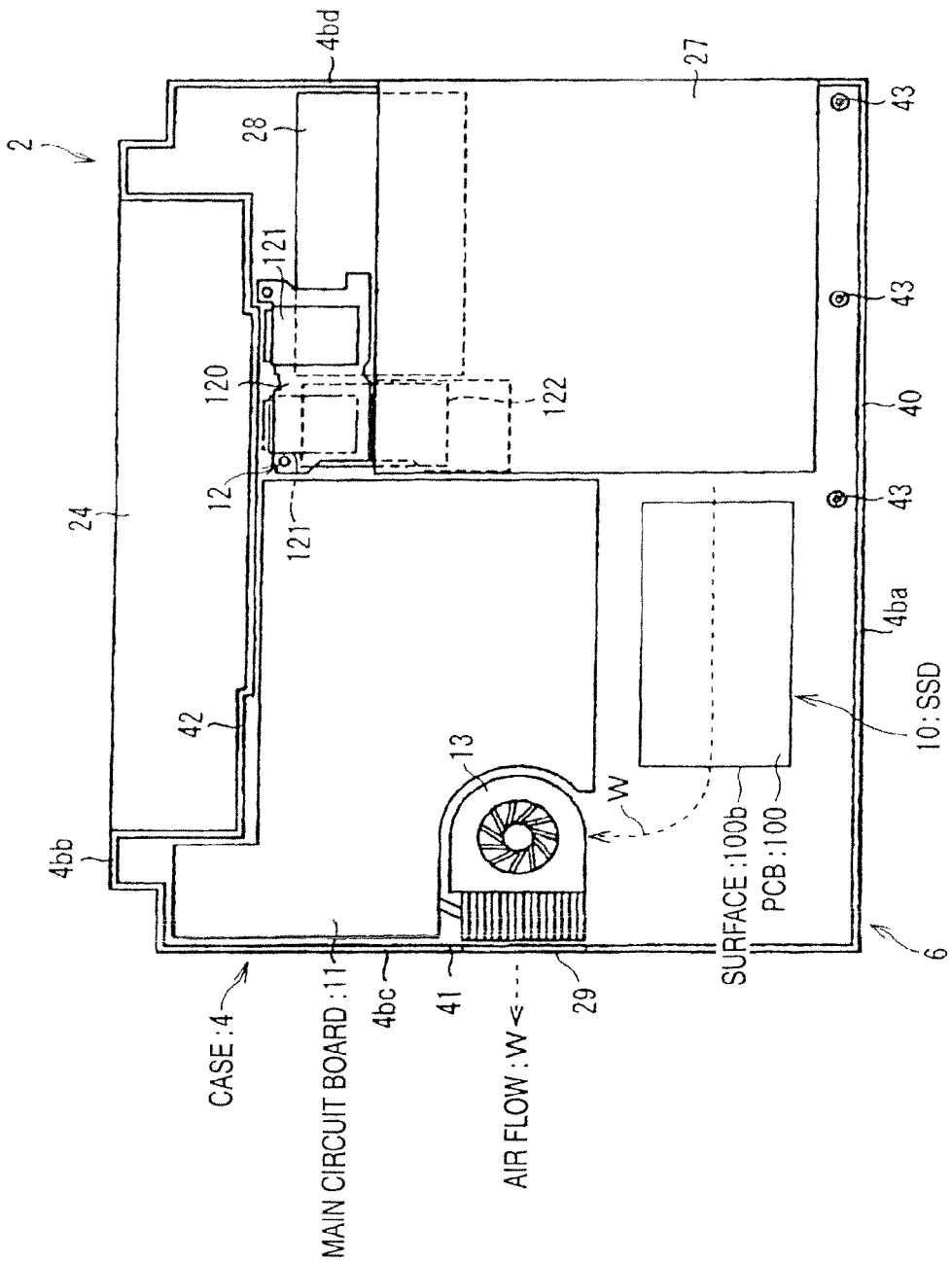
FIG. 2 is a plan view illustrating the inside of a main unit of the information processing apparatus.
Figure 3:
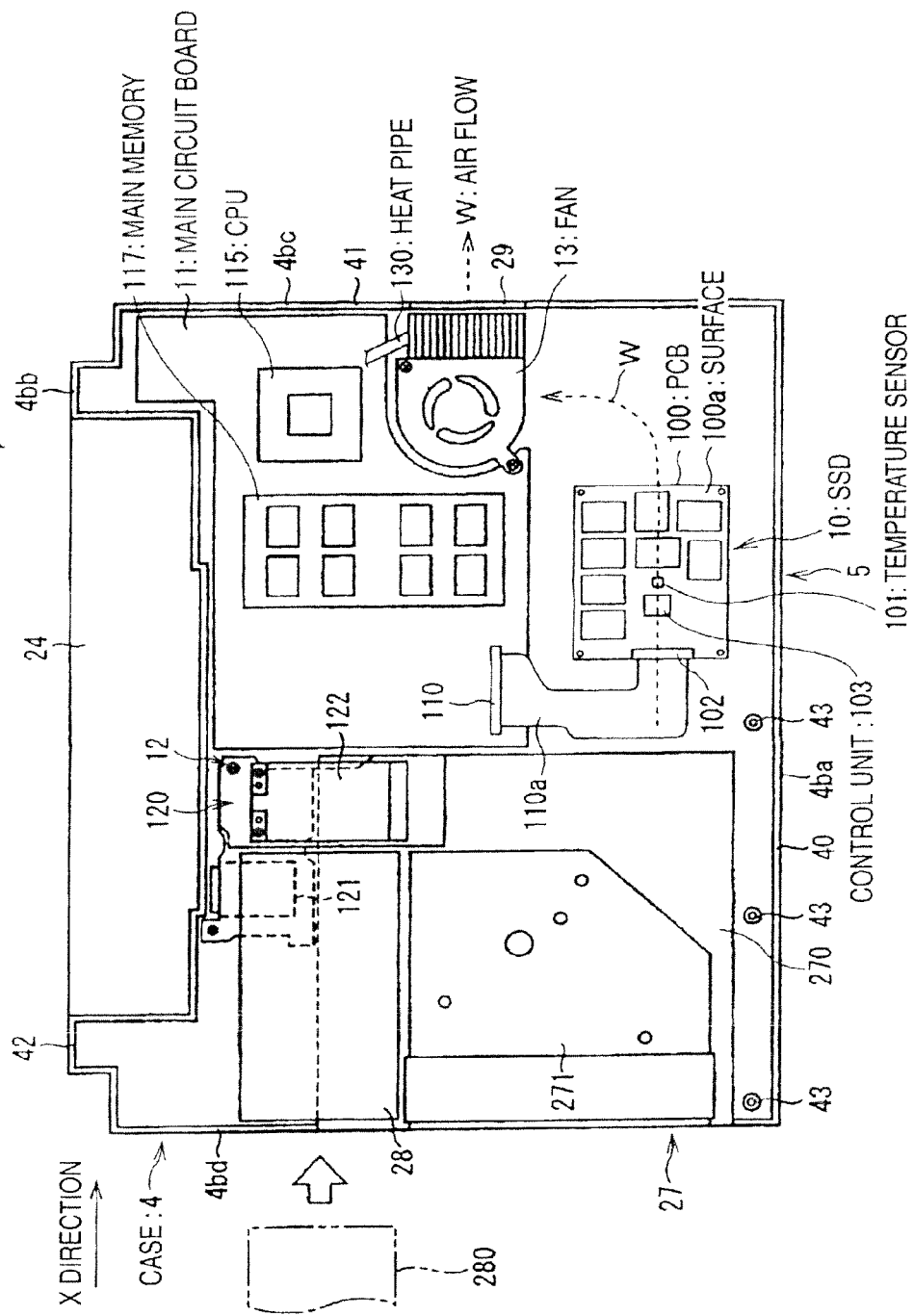
FIG. 3 is a bottom view illustrating the inside of the main unit of the information processing apparatus.

FIG. 2 is a plan view illustrating the main unit 2, and FIG. 3 is a bottom view illustrating the main unit 2 viewed from the below. In order to show the layout in the case 4, the case cover 5 is omitted in FIG. 2 and the case base 6 is omitted in FIG. 3. A plurality of bosses 43 are provided in the case cover 5 and the case base 6.

In the case 4, a main circuit board 11, an extension module 12, and a fan 13 are accommodated in addition to the SSD 10, the battery pack 24, the ODD 27, and the card slot 28.

The main circuit board 11 is a member on which a plurality of electronic components are mounted and which performs a predetermined operation when these electronic components function. In addition, the main circuit board 11 is connected to the SSD 10 through a cable 110a combined with a connector 110 and is connected to the battery pack 24, the ODD 27, the card slot 28, the extension module 12, and the fan 13 through a cable (not shown).

The ODD 27 has a case 270 accommodated in the case 4 and a disk tray 271 which is accommodated within the case 270 so as to be able to be drawn out and on which an optical storage medium is placed.

The shape of the card slot 28 is set by the standard of a PC card slot or ExpressCard (registered trademark) slot, for example.

The extension module 12 includes an extension circuit board 120, a card socket 121 provided in the extension circuit board 120, and an extension module board 122 inserted in the card socket 121. The card socket 121 is based on the standard of Mini-PCI, for example, and examples of the extension module board 122 include a 3G (third generation) module, a TV tuner, a GPS module, a Wimax (registered trademark) module, and the like.

The fan 13 is a cooling unit that cools the inside of the case 4 on the basis of ventilation and exhausts the air in the case 4, as the air flow W, to the outside through the exhaust port 29. In addition, one end of a heat pipe 130 is provided between the fan 13 and the exhaust port 29 and the other end of the heat pipe 130 is provided to be connected to a CPU 115 (not shown). The heat pipe 130 emits evaporative latent heat when the operating fluid provided thereinside evaporates at a side of the CPU 115, which is a heating portion, to become vapor and then the vapor moves through the pipe toward the exhaust port side, which is a low-temperature portion, to be condensed. The condensed operating fluid flows back to the heating portion.

The SSD 10 includes a printed circuit board (PCB) 100. A temperature sensor 101, a connector 102, a control unit (memory controller) 103, and the like are mounted on a surface 100a of the PCB 100. The SSD 10 is accommodated in the case 4 such that the control unit 103 is located at the upstream side of the air flow W, which flows from the inside of the case 4 to the outside due to the fan 13, and the temperature sensor 101 is located at the downstream side of the air flow W. In addition, the connector 102 that electrically connects the SSD 10 and the main circuit board 11 with each other is disposed at the more upstream side of the air flow W, which flows from the inside of the case 4 to the outside, than the control unit 103.

Figure 4:
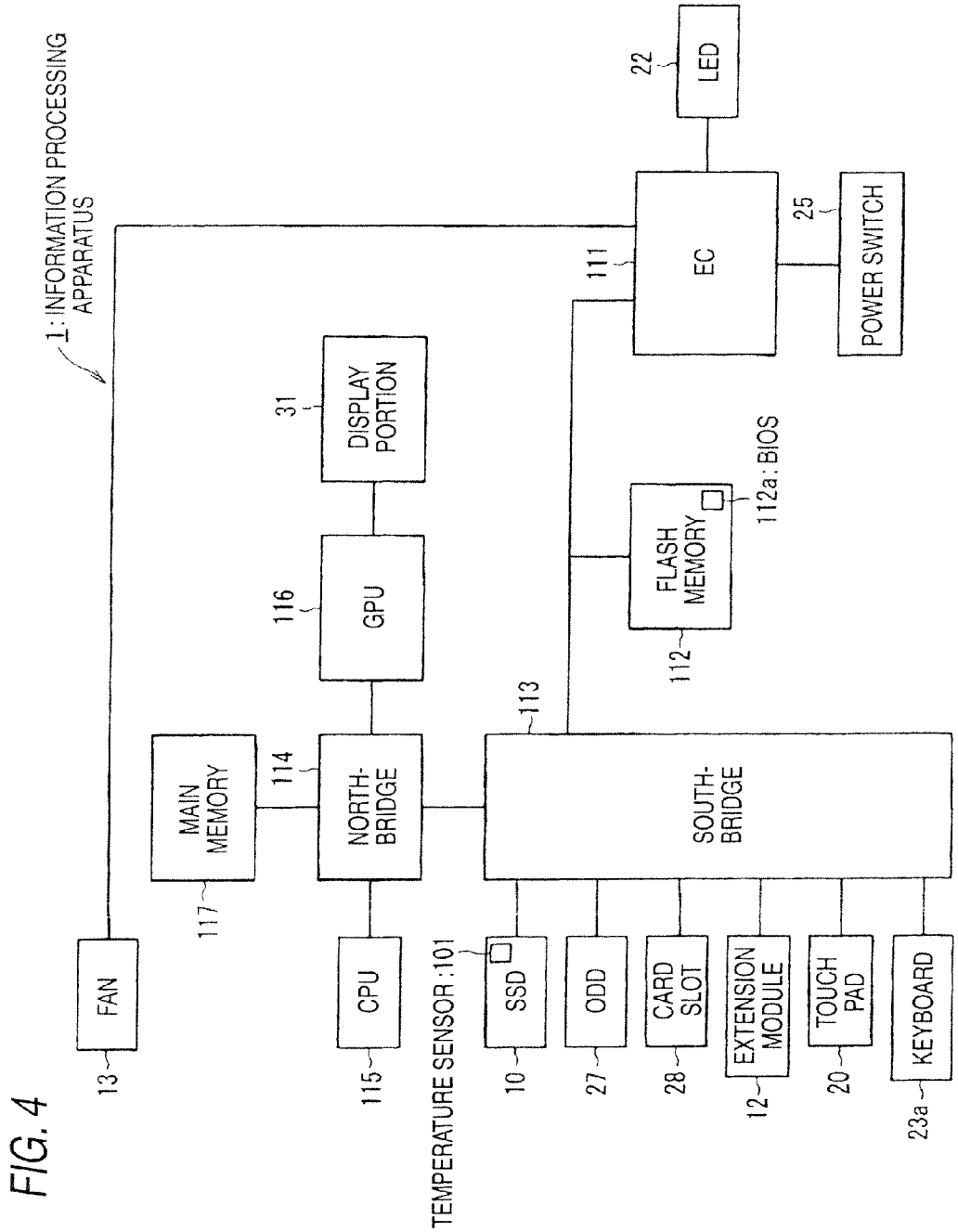
FIG. 4 is a block diagram illustrating the schematic configuration of the information processing apparatus.

FIG. 4 is a block diagram illustrating the schematic configuration of an information processing apparatus. In addition to the SSD 10, the extension module 12, the fan 13, the touch pad 20, the keyboard 23a, the LED 22, the power switch 25, the ODD 27, the card slot 28, and the display portion 31 described above, the information processing apparatus 1 includes an EC (embedded controller) 111 that is an embedded system for controlling each portion, a flash memory 112 that stores a BIOS (basic input output system) 112a, a southbridge 113 that is an LSI (large scale integration) chip and functions as various buses and I/O controller, a northbridge 114 that controls the connection among a CPU (central processing unit) 115 that is an LSI chip and is to described later, a GPU (graphic processing unit) 116, a main memory 117, and various kinds buses, the CPU 115 for performing operation processing of various signals, the GPU 116 that performs operation processing of image signals and performs display control, and the main memory 117 in which reading and writing are performed by the CPU 115.

In addition, the EC 111, the flash memory 112, the southbridge 113, the northbridge 114, the CPU 115, the GPU 116, and the main memory (main storage device) 117 are electronic components mounted on the main circuit board 11.

Figure 5:
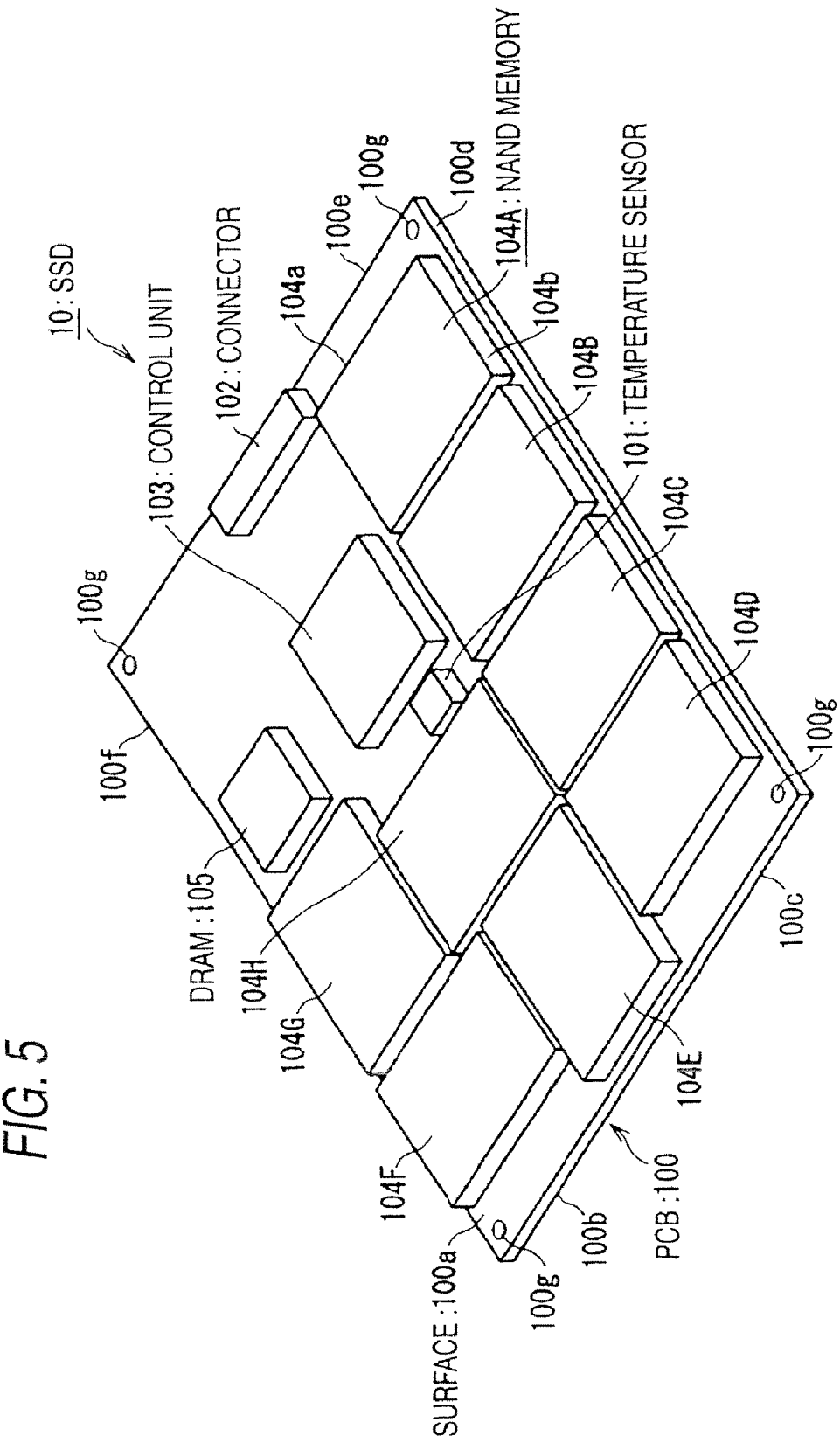
FIG. 5 is a perspective view illustrating an example of the appearance of an SSD.

FIG. 5 is a perspective view illustrating an example of the appearance of the SSD. The SSD 10 includes the PCB 100 with surfaces 100a to 100f and is provided with the temperature sensor 101, the connector 102, the control unit 103, eight NAND memories (memory packages) 104A to 104H, and a DRAM 105 which are mounted on the surface 100a of the PCB 100. The NAND memories 104A to 104H have the same shape. The SSD 10 is an external storage device which stores data or programs and recorded data or programs of which are not removed even if power is not supplied. Although the SSD 10 does not have a drive mechanism such as a head or a magnetic disk in a known hard disk drive, the SSD 10 is a drive that can store a program, such as an OS (operating system), or data created by a user or execution of software in storage regions of the eight NAND memories 104A to 104H mounted on the PCB 100 such that the program or data can be read or written similar to the known hard disk drive and that is formed of a nonvolatile semiconductor memory that can operate as a drive for starting the information processing apparatus 1.

Each of the NAND memories 104A to 104H has an outer shape with a long side 104a and a short side 104b, for example, as shown in the NAND memory 104A. The NAND memories 104A to 104D are mounted such that the long sides 104a are adjacent to each other along a right side surface of the PCB 100. In addition, the NAND memories 104E to 104H are mounted on the PCB 100 such that the long sides 104a are adjacent to the short sides 104b.

The temperature sensor 101 is located between the long side of the NAND memory 104H and one side of the control unit 103 and is provided adjacent to both the sides. In addition, the connector 102 used to connect the SSD 10 with the outside is provided at a side opposite the side where the temperature sensor 101 of the control unit 103 is provided.

Figure 6:
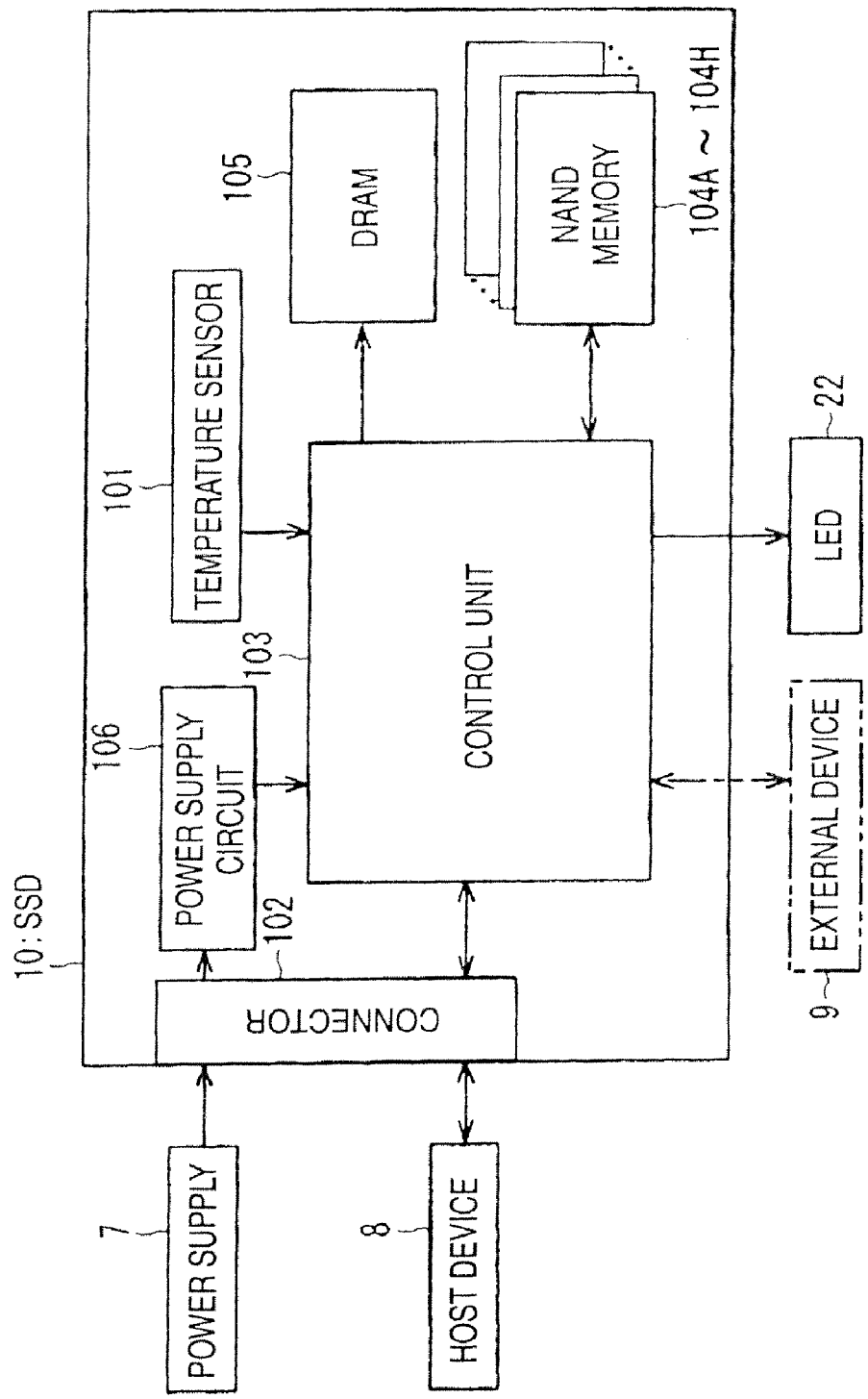
FIG. 6 is a block diagram illustrating the schematic configuration of the SSD.

FIG. 6 is a block diagram illustrating the schematic configuration of the SSD. The control unit 103 is connected to the temperature sensor 101, the connector 102, the eight NAND memories 104A to 104H, the DRAM 105, and a power supply circuit 106. In addition, the control unit 103 is connected to a host device 8 through the connector 102 so as to be connected to an external device 9 as needed.

A power supply 7 is the battery pack 24 or an AC adaptor (not shown). For example, DC 3.3 V is supplied to the power supply circuit 106 through the connector 102. In addition, the power supply 7 supplies power to the entire information processing apparatus 1.

The host device 8 is the main circuit board 11 in the present embodiment, and the control unit 103 and the southbridge 113 mounted on the main circuit board 11 are connected to each other. Between the southbridge 113 and the control unit 103, transmission and reception of data are performed on the basis of the serial ATA specification, for example.

The external device 9 is another information processing apparatus different from the information processing apparatus 1. The external device 9 is connected to the control unit 103 of the SSD 10 detached from the information processing apparatus 1 on the basis of the RS-232C standard, for example, and has a function of reading data stored in the NAND memories 104A to 104H.

The PCB 100 has the same outer size as a 1.8 inch type or 2.5 inch type HDD (hard disk drive), for example. In addition, in the present embodiment, the outer size of the PCB 100 is equivalent to the 1.8 inch type. In addition, the PCB 100 has a plurality of through holes 100g used to fix the PCB 100 to the case 4.

The temperature sensor 101 is provided between the control unit 103 and the NAND memories 104A to 104H, which serve as heat sources, on the PCB 100. In the example shown in FIG. 5, the temperature sensor 101 is provided near the middle of the PCB 100 so as to be surrounded by the control unit 103 and the NAND memories 104A to 104H and measures the temperature at the position. The measurement temperature measured by the temperature sensor 101 is transmitted to the control unit 103 as temperature information. In addition, although a semiconductor temperature sensor using a characteristic that a voltage of a PN-junction portion of a semiconductor changes with temperature is used in the present embodiment, temperature sensors based on other methods, such as a thermistor, may also be used.

In the case when the SSD 10 is operating, the temperature measured by the temperature sensor 101 provided at the position is 50 degrees Celsius to 60 degrees Celsius, for example, and is higher by about 10 degrees Celsius than those in the other regions of the PCB 100.

The control unit 103 controls operations of the NAND memories 104A to 104H. Specifically, the control unit 103 controls reading/writing of data from/into the NAND memories 104A to 104H in response to the request from the main circuit board 11 as the host device 8. The data transfer rate is 100 MB/sec at the time of reading of data and 40 MB/sec at the time of writing of data, for example.

In addition, the control unit 103 acquires temperature information from the temperature sensor 101 at a predetermined period and writes the acquired temperature information in predetermined addresses of the NAND memories 104A to 104H together with the acquisition date and time.

Each of the NAND memories 104A to 104H has an outer shape with a long side and a short side and the thickness is mm, for example. The NAND memories 104A to 104H are asymmetrically mounted on the PCB 100. That is, in the example shown in FIG. 5, four NAND memories 104A to 104D of the NAND memories 104A to 104H are disposed in a uniform state so that the long sides are approximately parallel, and the other four NAND memories 104E to 104H are disposed in a combination state so that the short sides and the long sides face each other. The NAND memories 104E to 104H may be disposed on the surface 100b of the PCB 100.

Each of the NAND memories 104A to 104H is a nonvolatile semiconductor memory having a storage capacity of 16 GB, for example, and is an MLC (multi level cell)-NAND memory (multi-value NAND memory) capable of recording two bits on one memory cell. Although the rewritable number of times of the MLC-NAND memory is generally smaller than that of an SLC (single level cell)-NAND memory, it is easy to make the storage capacity large. In addition, the NAND memories 104A to 104H have the characteristics that a period for which data can be stored changes with the set environmental temperature.

The NAND memories 104A to 104H store data written by the control of the control unit 103 and store the temperature information and the acquisition date as temperature history.

The DRAM 105 is a buffer that temporarily stores data when reading/writing of data from/into the NAND memories 104A to 104H is performed by the control of the control unit 103.

The connector 102 has a shape based on the serial ATA specification, for example. In addition, the control unit 103 and the power supply circuit 106 may be connected to the host device 8 and the power supply 7 by separate connectors, respectively.

The power supply circuit 106 converts DC 3.3 V supplied from the power supply 7 into DC 1.8 V and 1.2 V, for example, and supplies these three kinds of voltages to portions of the SSD 10 so as to match driving voltages of the portions.

Hereinafter, an operation of the information processing apparatus according to the first embodiment of the invention will be described. First, when a user presses the power switch 25, the EC 111 that has detected the pressing of the power switch 25 starts supply of power from the power supply 7 to each portion of the information processing apparatus 1. Then, the EC 111 starts the information processing apparatus 1 on the basis of the BIOS 112a.

Then, when the information processing apparatus 1 is started, the user performs an operation on the information processing apparatus 1 by using the touch pad 20 and the keyboard 23a while viewing the display screen 31a of the display portion 31.

Then, when the information processing apparatus 1 receives the user's operation, the information processing apparatus 1 performs a predetermined operation in response to the operation. For example, in the case where the CPU 15 of the information processing apparatus 1 receives an operation for displaying data stored in the SSD 10 on the display portion 31, the CPU 115 orders the SSD 10 to read data. Then, the control unit 103 of the SSD 10 reads the data from the NAND memories 104A to 104H and transmits the data to the GPU 116 through the southbridge 113 and the northbridge 114. Then, the GPU 116 displays the data as an image on the display portion 31.

While the information processing apparatus 1 is performing the above operation, the temperature sensor 101 of the SSD 10 measures the temperature at the position where the temperature sensor 101 is provided.

Then, the control unit 103 acquires the measurement temperature measured by the temperature sensor 101, as temperature information, at a predetermined period and stores the acquired temperature information and acquisition date and time in predetermined addresses of the NAND memories 104A to 104H as temperature history.

Thereafter, when the user instructs the information processing apparatus 1 to display the temperature history stored in the NAND memories 104A to 104H, the control unit 103 reads the temperature history and displays the read temperature history on the display portion 31 through the GPU 116.

In addition, in the case where the SSD 10 is detached from the case 4, the external device 9 is connected to the detached SSD 10. Then, when a command that instructs reading of the temperature history is transmitted from the external device 9 to the control unit 103, the control unit 103 reads the temperature history stored in the NAND memories 104A to 104H and then transmits the read temperature history to the external device 9. Then, when the external device 9 receives the temperature history, the temperature history is displayed on the display portion provided in the external device 9.

According to the first embodiment of the invention, it is possible to measure the temperature of a region with a high temperature compared with the other regions of the PCB 100 since the temperature sensor 101 is provided between the control unit 103 and the NAND memory 104H.

Furthermore, since the plurality of NAND memories 104A to 104H are mounted on the PCB 100 by combination of the long side 104a and the short side 104b, other electronic components, such as the control unit 103 and the DRAM 105, can be efficiently disposed on the PCB 100.

Furthermore, since the temperature sensor is provided at the position surrounded by the control unit 103 and the plurality of NAND memories 104A to 104H, it is not necessary to dispose a plurality of temperature sensors on the PCB 100. As a result, a manufacturing cost can be reduced.

Furthermore, by positioning the control unit 103 of the SSD 10 at the upstream side of the air flow W generated by the fan 13 and the temperature sensor 101 at the downstream side, it becomes possible to measure the temperature at the position where the temperature is very likely to be higher than that of the control unit 103 cooled by the air flow W.

In addition, it is possible to check the environmental temperature in a situation where the SSD 10 was used in a time-sequential manner by storing the temperature history in the NAND memories 104A to 104H. In addition, the temperature history may be read by not only the control unit 103 but also the southbridge 113 when performing processing for reducing the temperature of the SSD 10, for example.

Second Embodiment

Figures 7A, 7B, 7C:
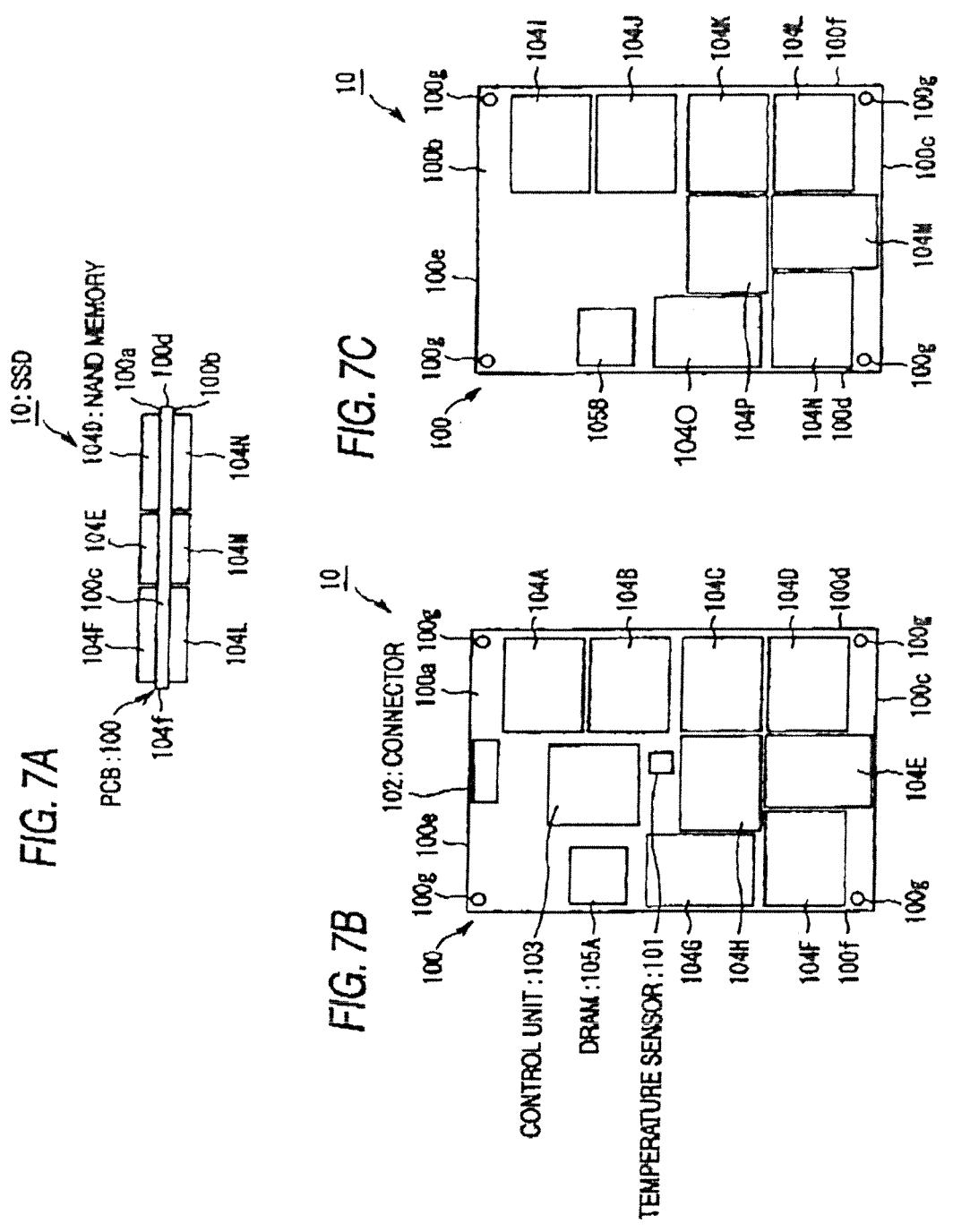

FIG. 7A is a schematic diagram illustrating the appearance of an SSD according to a second embodiment of the invention. While the NAND memories are mounted on the surface 100a in the case of the SSD 10 according to the first embodiment, NAND memories are mounted on both surfaces 100a and 100b in the case of the SSD 10 as shown in FIG. 7A.

That is, the SSD 10 includes a temperature sensor 101, a connector 102, a control unit 103, eight NAND memories 104A to 104H, and a DRAM 105A mounted on the surface 100a, as shown in a plan view of FIG. 7B. In addition, the SSD 10 further includes eight NAND memories 1041 to 104P and a DRAM 105B mounted on the surface 100b, as shown in a bottom view of FIG. 7C. In addition, the configuration of each portion is the same as that in the first embodiment and accordingly, an explanation thereof will be omitted.

The NAND memories 104A to 104H provided on the surface 100a and the NAND memories 1041 to 104P provided on the surface 100b are disposed symmetrically with respect to the direction of the long side of the PCB 100. In addition, the NAND memories 1041 to 104P may also be disposed symmetrically with respect to the direction of the short side of the PCB 100. Alternatively, the NAND memories 1041 to 104P may also be disposed in a state where the NAND memories 1041 to 104P are rotated by 180 degrees on the surfaces 100a and 100b.

According to the second embodiment of the invention, the storage capacity per occupied area of the PCB 100 can be increased because the NAND memories 104A to 104P are mounted on both surfaces of the SSD 10.

In addition, since the temperature distribution in the entire SSD 10 can be made uniform by symmetrically disposing the NAND memories on both surfaces of the SSD 10, reduction in data storage period of the SSD 10 caused by the environmental temperature can be suppressed.

Other Embodiments

In addition, the invention is not limited to the above-described embodiments but various modifications may be made without departing from or changing the spirit and scope of the invention.

As described above in detail, there are provided an information processing apparatus and a nonvolatile semiconductor storage device that are capable to measure the temperature of a region which is located between a semiconductor memory and a control unit and whose temperature is higher than those of other regions of a PCB.

What is claimed is:
1. A nonvolatile semiconductor storage device comprising:
a printed circuit board having a rectangle shape;
a plurality of nonvolatile semiconductor memory chips that are mounted on the printed circuit board, each of the plurality of nonvolatile semiconductor memory chips having a shape configured by a pair of long sides and a pair of short sides; and a memory controller that is mounted on the printed circuit board and controls the plurality of nonvolatile semiconductor memory chips, wherein the plurality of nonvolatile semiconductor memory chips comprises a first nonvolatile semiconductor memory chip, a second nonvolatile semiconductor memory chip and a third nonvolatile semiconductor memory chip arranged on the printed circuit board, wherein one side of the pair of short sides of the first nonvolatile semiconductor memory chip faces one of the side edges of the printed circuit board, wherein a short side of the pair of short sides of the second nonvolatile semiconductor memory chip faces a first long side of the pair of long sides of the first nonvolatile semiconductor memory chip and a short side of the pair of short sides of the third nonvolatile semiconductor memory chip faces a second long side of the pair of long sides of the first nonvolatile semiconductor memory chip, and wherein a through hole in the printed circuit board is disposed at an area adjacent to a long side of the pair of long sides of at least one of the second nonvolatile semiconductor memory chip and the third nonvolatile semiconductor memory chip.

2. The device of claim 1, wherein each of the plurality of nonvolatile semiconductor memory chips comprises a multi-value NAND memory module.

3. A nonvolatile semiconductor storage device comprising:
a printed circuit board;
a plurality of nonvolatile semiconductor memory packages that are mounted on the printed circuit board, each of the plurality of nonvolatile semiconductor memory packages having a perimeter with a pair of long sides and a pair of short sides; and
a memory controller that is mounted on the printed circuit board and controls the plurality of nonvolatile semiconductor memory packages, wherein the plurality of the nonvolatile semiconductor memory packages comprises a first nonvolatile semiconductor memory package, a second nonvolatile semiconductor memory package and a third nonvolatile semiconductor memory package arranged on the printed circuit board, wherein a short side of the pair of short sides of the first nonvolatile semiconductor memory package faces a side edge of the printed circuit board, a short side of the pair of short sides of the second nonvolatile semiconductor memory package faces a first long side of the pair of long sides of the first nonvolatile semiconductor memory package and a short side of the pair of short sides of the third nonvolatile semiconductor memory package faces a second long side of the pair of long sides of the first nonvolatile semiconductor memory package, and wherein a through hole in the printed circuit board is disposed at an area adjacent to a long side of the pair of long sides of at least one of the second nonvolatile semiconductor memory package and the third nonvolatile semiconductor memory package.

4. The device of claim 3, wherein each of the plurality of nonvolatile semiconductor memory packages comprises a multi-value NAND memory module.

5. A nonvolatile semiconductor storage device comprising:
a printed circuit board;
a plurality of nonvolatile semiconductor memory packages that are mounted on the printed circuit board, the plurality of nonvolatile semiconductor memory packages comprises a first nonvolatile semiconductor memory package, a second nonvolatile semiconductor memory package and a third nonvolatile semiconductor memory package, each of the plurality of nonvolatile semiconductor memory packages having a shape configured by a pair of long sides and a pair of short sides; and
a memory controller that is mounted on the printed circuit board and controls the plurality of nonvolatile semiconductor memory packages, wherein a first long side of the pair of long sides of the first nonvolatile semiconductor memory package is adjacent to a first short side of the pair of short sides of the second nonvolatile semiconductor memory package and a second long side of the pair of long sides of the first nonvolatile semiconductor memory package is adjacent to a first short side of the pair of short sides of the third nonvolatile semiconductor memory package, wherein a first short side of the pair of short sides of the first nonvolatile semiconductor memory package, a first long side of the pair of long sides of the second nonvolatile semiconductor memory package and a first long side of the pair of long sides of the third nonvolatile semiconductor memory package are substantially in-line.

6. The device of claim 5, wherein a second short side of the pair of short sides of the second nonvolatile semiconductor memory package faces a first side edge of the printed circuit board.

7. The device of claim 5, wherein a second short side of the pair of short sides of the third nonvolatile semiconductor memory package faces and is adjacent to a side edge of the printed circuit board.

8. The device of claim 6, wherein a second short side of the pair of short sides of the third nonvolatile semiconductor memory package faces and is adjacent to a second side edge of the printed circuit board.

9. The device of claim 8, wherein a second short side of the pair of short sides of the first nonvolatile semiconductor memory package faces and is adjacent to a third side edge of the printed circuit board.

10. The device of claim 5, wherein a second short side of the pair of short sides of the first nonvolatile semiconductor memory package faces and is adjacent to a side edge of the printed circuit board.

* * * * *